(12) United States Patent
Chen et al.

(10) Patent No.: US 12,164,852 B2
(45) Date of Patent: Dec. 10, 2024

(54) LAYOUT METHOD AND LAYOUT APPARATUS FOR INTEGRATED CIRCUIT

(71) Applicant: CHANGXIN MEMORY TECHNOLOGIES, INC., Hefei (CN)

(72) Inventors: Chuanjiang Chen, Hefei (CN); Kang Zhao, Hefei (CN); Li Bai, Hefei (CN); Li Tang, Hefei (CN); Jing Xu, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 515 days.

(21) Appl. No.: 17/504,734

(22) Filed: Oct. 19, 2021

(65) Prior Publication Data
US 2022/0147686 A1 May 12, 2022

Related U.S. Application Data

(63) Continuation of application No. PCT/CN2021/104007, filed on Jul. 1, 2021.

(30) Foreign Application Priority Data

Nov. 9, 2020 (CN) .......................... 202011237506.6

(51) Int. Cl.
*G06F 30/392* (2020.01)
*G06F 30/398* (2020.01)

(52) U.S. Cl.
CPC .......... *G06F 30/392* (2020.01); *G06F 30/398* (2020.01)

(58) Field of Classification Search
CPC .. G06F 30/392; G06F 30/398; G06F 2119/18; H01L 27/02; H01L 27/0207; H10B 12/00; H10B 12/02
See application file for complete search history.

(56) References Cited

U.S. PATENT DOCUMENTS

2002/0087942 A1 7/2002 Kitada
2005/0193364 A1* 9/2005 Kotani ...................... G03F 1/36
257/394

(Continued)

FOREIGN PATENT DOCUMENTS

CN 101123203 A 2/2008
CN 101364595 A 2/2009

(Continued)

OTHER PUBLICATIONS

International Search Report for International Application PCT/CN2021/104007 mailed Sep. 18, 2021.

(Continued)

*Primary Examiner* — Nha T Nguyen
(74) *Attorney, Agent, or Firm* — Syncoda LLC; Feng Ma (57) ABSTRACT

A layout method for an integrated circuit includes the following steps: providing a layout, the layout including a first element region and a second element region, a spacing region being provided between the first element region and the second element region; and detecting whether a width of the spacing region is less than a preset width, and if yes, marking at least one of the first element region, the second element region and the spacing region, the preset width being a minimum width meeting a requirement, wherein the requirement is to fill the spacing region with at least one dummy pattern. A layout apparatus employing the layout method for the integrated circuit can quickly and accurately position a poorly-placed element region in the layout, improve the layout efficiency and layout precision of the integrated circuit, and lay a foundation for improving photolithography quality.

15 Claims, 8 Drawing Sheets

(56) References Cited

U.S. PATENT DOCUMENTS

| | | | | |
|---|---|---|---|---|
| 2007/0168898 A1* | 7/2007 | Gupta | ................... | G06F 30/39 716/132 |
| 2011/0029936 A1 | 2/2011 | Baek et al. | | |
| 2013/0244144 A1* | 9/2013 | Blatchford | ............... | G03F 1/36 430/5 |
| 2017/0062582 A1 | 3/2017 | Choi et al. | | |

FOREIGN PATENT DOCUMENTS

| | | |
|---|---|---|
| CN | 101752368 A | 6/2010 |
| CN | 101819947 A | 9/2010 |
| CN | 103778273 A | 5/2014 |
| CN | 106449628 A | 2/2017 |
| CN | 110852032 A | 2/2020 |
| JP | 2008122948 A | 5/2008 |

OTHER PUBLICATIONS

Written Opinion for International Application PCT/CN2021/104007 mailed Sep. 18, 2021.
Extended European Search Report for EP application No. 21888187.8, dated Dec. 19, 2023.
First Office action of JP application No. 2023-501319, dated Dec. 26, 2023.

\* cited by examiner

S11 — Provide a layout, the layout including a first element region and a second element region, a spacing region being provided between the first element region and the second element region S12 — Detect whether a width of the spacing region is less than a preset width, and if yes, mark at least one of the first element region, the second element region and the spacing region, the preset width being a minimum width meeting a requirement, wherein the requirement is to fill the spacing region with at least one virtual pattern

FIG. 1 (amended)

LAYOUT METHOD AND LAYOUT APPARATUS FOR INTEGRATED CIRCUIT

CROSS-REFERENCE TO RELATED APPLICATIONS

This application is a continuation of International Patent Application No. PCT/CN2021/104007 filed on Jul. 1, 2021, which claims priority to Chinese Patent Application No. 202011237506.6 filed on Nov. 9, 2020. The disclosures of the above-referenced patent applications are incorporated herein by reference in their entirety.

TECHNICAL FIELD

The present application relates to the field of integrated circuit manufacturing, and in particular, to a layout method and a layout apparatus for an integrated circuit.

BACKGROUND

A Dynamic Random Access Memory (DRAM) is a semiconductor device commonly used in electronic devices such as computers, and consists of a plurality of repeating memory cells. Each memory cell generally includes a transistor and a capacitor.

The transistor has a gate electrically connected to a wordline, a source electrically connected to a bitline and a drain electrically connected to the capacitor. A wordline voltage on the wordline can control ON and OFF of the transistor so that through the bitline, data information stored in the capacitor can be read or data information is written to the capacitor.

With the continuous reduction of DRAM process nodes, requirements for uniformity of a layout are becoming ever higher. In a latest LP (Low Power) process, a process library has three small trench lengths (5X m, 6X nm, and 7X nm). The smaller size makes a single-node process of the DRAM more complex, and an etch error is very easy to occur in a manufacturing process. In order to compensate for this error, pseudo-gates with a corresponding length and spaced by a specific distance may generally be added to two sides of the transistor to facilitate the formation of diffraction during photolithography, so as to improve the etch accuracy of the trench length of the transistor in an edge region. However, since a number of transistors on the layout is tens of millions and the placement of transistors with small trench lengths is extremely complex, a tight development cycle makes engineers unable to manually add the pseudo-gates in a short time, which limits the improvement of subsequent chip photolithography quality.

Therefore, how to improve the layout efficiency and layout precision of an integrated circuit, improve photolithography quality, shorten a development cycle of the integrated circuit, and improve a yield of semiconductor products are an urgent technical problem to be solved currently.

SUMMARY

Embodiments of the present application provide a layout method and a layout apparatus for an integrated circuit, which solves the problem of low efficiency of an existing integrated circuit layout to some extent, so as to improve the layout precision, improve the photolithography quality, shorten the development cycle of the integrated circuit, and improve the yield of semiconductor products.

According to one aspect of the embodiments of the present application, a layout method for an integrated circuit is provided, including the following steps:
providing a layout, the layout including a first element region and a second element region, a spacing region being provided between the first element region and the second element region; and
detecting whether a width of the spacing region is less than a preset width, and if yes, marking at least one of the first element region, the second element region and the spacing region, the preset width being a minimum width meeting a requirement, wherein the requirement is to fill the spacing region with at least one dummy pattern.

According to another aspect of the embodiments of the present application, a layout apparatus for an integrated circuit is provided, including:
a memory module configured to store a layout, the layout including a first element region and a second element region, a spacing region being provided between the first element region and the second element region; and
a detection module connected to the memory module and configured to detect whether a width of the spacing region is less than a preset width, and if yes, mark at least one of the first element region, the second element region and the spacing region, the preset width being a minimum width meeting a requirement, wherein the requirement is to fill the spacing region with at least one dummy pattern.

Through the layout method and the layout apparatus for an integrated circuit according to the embodiments of the present application, a width of a spacing region between two adjacent element regions in a layout is automatically detected, and an element region and/or a spacing region not meeting a filling requirement of a dummy pattern are/is marked, so as to quickly and accurately position a poorly-placed element region in the layout, so that the layout can be adjusted in time, which saves human resources, improves the layout efficiency and layout precision of the integrated circuit, and lays a foundation for improving the photolithography quality, shortening the development cycle of the integrated circuit, and improving the yield of semiconductor products and the like.

BRIEF DESCRIPTION OF DRAWINGS

The above and other objectives, features and advantages of the present application will become more apparent from following descriptions of the embodiments of the present application with reference to accompanying drawings, in which.

DESCRIPTION OF EMBODIMENTS

In order to make the objectives, technical solutions and advantages of the present application clearer, the present application is described in further detail below through embodiments in conjunction with the accompanying drawings. However, it is to be understood that these descriptions are illustrative only and not intended to limit the scope of the present application. Further, in the following, descriptions of known structures and technologies are omitted to avoid unnecessary confusion between concepts of the present application.

In the drawings, various structural diagrams and cross-sectional views of a semiconductor device according to the present application are shown. The drawings are not drawn to scale, and some details may be enlarged while some details may be omitted for sake of clarity. Shapes, relative sizes and position relationships of regions and layers shown in the drawings are only illustrative, and deviations therefrom may occur due to manufacture tolerances and technique limitations in practice. Those skilled in the art can also design regions/layers of other different shapes, sizes, and relative positions according to an actual requirement.

Figure 1:
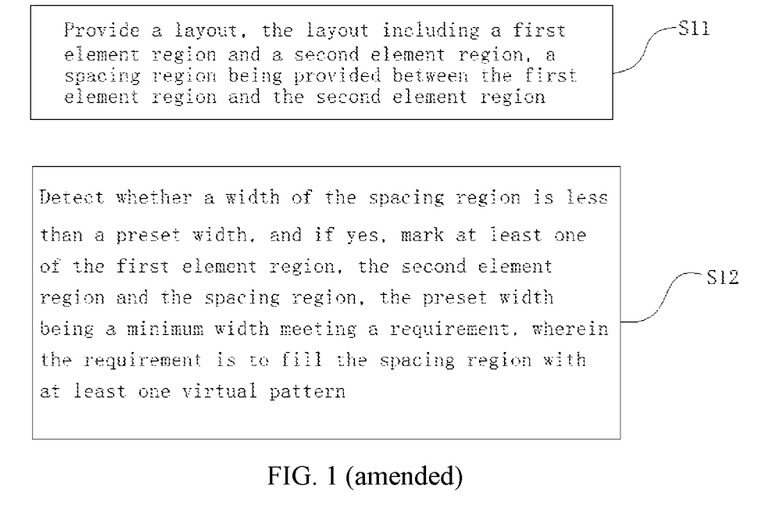
FIG. 1 is a flowchart of a layout method for an integrated circuit according to a specific implementation of the present application.

This specific implementation provides a layout method for an integrated circuit. FIG. 1 is a flowchart of a layout method for an integrated circuit according to a specific implementation of the present application, and FIG. 2A to FIG. 2D are schematic diagrams of detection of a layout according to a specific implementation of the present application. As shown in FIG. 1 and FIG. 2A to FIG. 2D, the layout method for an integrated circuit according to the specific implementation includes the following steps.

Figure 2A:
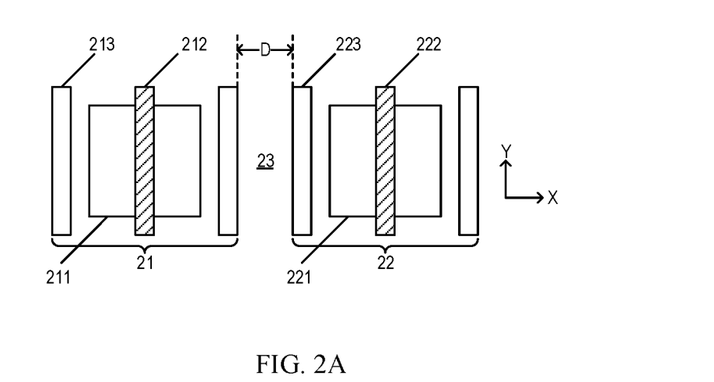
FIG. 2A to FIG. 2D are schematic diagrams of detection of a layout according to a specific implementation of the present application.

In step S11, a layout is provided, the layout including a first element region 21 and a second element region 22, a spacing region 23 being provided between the first element region 21 and the second element region 22, as shown in FIG. 2A.

Specifically, the layout includes a plurality of element regions that may be arranged according to a layout requirement of the integrated circuit. Each element region includes a plurality of elements. Structures and arrangement manners of the elements in each element region may be the same or different, and a spacing region is provided between the adjacent element regions. The spacing region is configured to be filled with a dummy pattern to meet diffraction requirements during subsequent photolithography of the element region. The element may be, but is not limited to, a transistor.

Figure 2B:
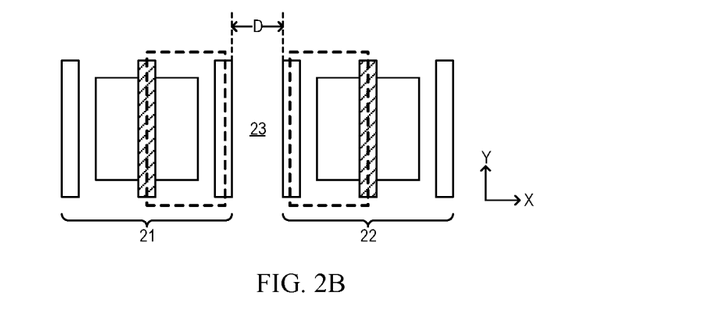
Figure 2C:
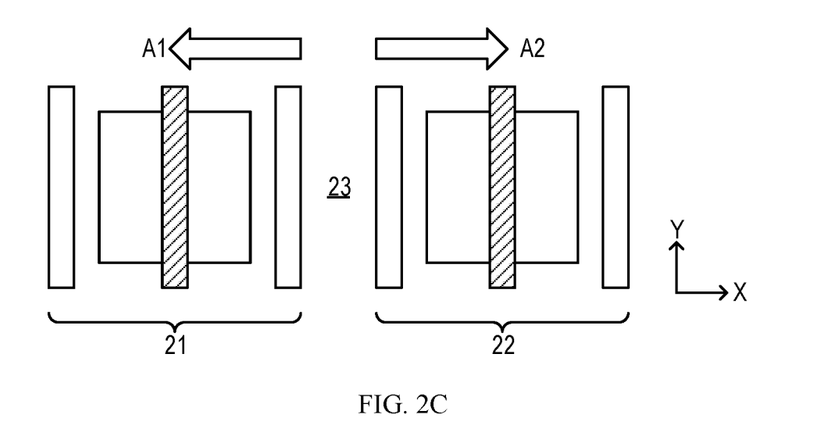
Figure 2D:
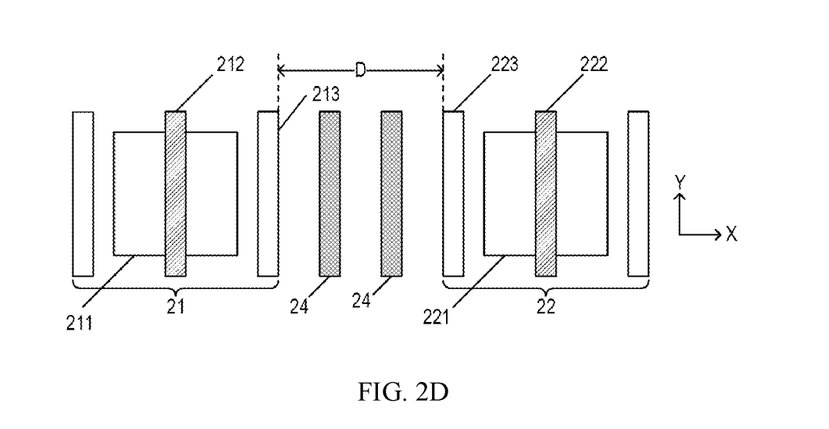

In step S12, it is detected whether a width D of the spacing region 23 is less than a preset width, and if yes, at least one of the first element region 21, the second element region 22 and the spacing region 23 is marked, and the preset width is a minimum width meeting a requirement, wherein the requirement is to fill the spacing region 23 with at least one dummy pattern 24, as shown in FIG. 2D.

Specifically, the dummy pattern refers to a pattern during photolithography that can not only compensate for the etch accuracy of the element within the element region, but also conform to DRC (Design Rule Verification). The preset width refers to a minimum width meeting the requirement of filling the spacing region with at least one dummy pattern, so that the etch accuracy of the element within the element region is improved. During the photolithography, a space between the first element region 21 and the second element region 22 adjacent to each other is filled with the dummy pattern 24, which can help the elements within the first element region 21 and/or the second element region 22 better form diffraction in the photolithography, thereby improving the etch accuracy. However, if the width D of the spacing region 23 is over narrow, the filling of the dummy pattern 24 is impossible due to the limitation of photolithography diffraction, thereby affecting the implementation of subsequent photolithography. In this specific implementation, the width D of the spacing region 23 between the first element region 21 and the second element region 22 adjacent to each other in the layout can be automatically detected and marks are made in the layout according to a detection result, so that a layout engineer can quickly and accurately position an unreasonably designed region in the layout, so as to adjust the layout in time and improve a development cycle of the layout. Those skilled in the art can set a specific marking manner according to an actual requirement. In this specific implementation, the first element region 21 and the second element region 22 that are unreasonably designed are simultaneously marked with a dashed box as shown in FIG. 2B. Those skilled in the art can also make marks with other patterns, colors or text.

Optionally, the first element region 21 includes a first active area 211, a first gate pattern 212 located in the first active area 211 and a first auxiliary pattern 213 located on one side of the first element region 21 toward the second element region 22, and the second element region 22 includes a second active area 221, a second gate pattern 222 located in the second active area 221 and a second auxiliary pattern 223 located on one side of the second element region 22 toward the first element region 21; and the step of detecting whether a width D of the spacing region 23 is less than a preset width specifically includes:

measuring a distance between the first auxiliary pattern 213 and the second auxiliary pattern 223; or measuring a distance between the first active area 211 and the second active area 221, and calculating a distance between the first auxiliary pattern 213 and the second auxiliary pattern 223.

Specifically, the first element region 21 includes the first active area 211, and two outer sides of the first active area 211 along an X-axis direction are provided with one first auxiliary pattern 213 respectively. The first gate pattern 212 and the first auxiliary pattern 213 extend along a Y-axis direction perpendicular to the X-axis direction, and the first gate pattern 212 and the first auxiliary pattern 213 are arranged along the X-axis direction. The first gate pattern 212 may be in a shape (including a line width and a length along the Y-axis direction) the same as the first auxiliary pattern 213. The first auxiliary pattern 213 is configured to help better diffraction formation during the photolithography of the first gate pattern, so as to effectively control a line width of the first gate pattern to be formed (i.e., a width of the first gate pattern along the X-axis direction). The second element region 22 includes a second active area 221, and two outer sides of the second active area 221 along the X-axis direction are provided with one second auxiliary pattern 223 respectively. The second gate pattern 222 and the second auxiliary pattern 223 extend along the Y-axis direction perpendicular to the X-axis direction, and the second gate pattern 222 and the second auxiliary pattern 223 are arranged along the X-axis direction. The second gate pattern 222 may be in a shape (including a line width along the X-axis direction and a length along the Y-axis direction) the same as the second auxiliary pattern 223. The second auxiliary pattern 223 is configured to help better diffraction formation during the photolithography of the second gate pattern, so as to effectively control a line width of the second gate pattern to be formed (i.e., a width of the second gate pattern along the X-axis direction).

During the layout design, generally, the first auxiliary pattern 213 and the first gate pattern 212 are simultaneously designed and a distance between the first auxiliary pattern 213 and the first gate pattern 212 is determinate. Therefore, in this specific implementation, the distance between the first auxiliary pattern 213 and the second auxiliary pattern 223 may be directly measured; or the distance between the first active area 211 and the second active area 221 may be measured, and the distance between the first auxiliary pattern 213 and the second auxiliary pattern 223 is indirectly calculated.

Optionally, the preset width includes a first subpreset width and a second subpreset width;

the first subpreset width is a minimum width meeting the requirement and existing between the dummy pattern 24 for filling and the first auxiliary pattern 213, and the second subpreset width is a minimum width meeting the requirement and existing between the dummy pattern 24 for filling and the second auxiliary pattern 223; and the minimum width meeting the requirement and existing between the dummy pattern 24 for filling and the first auxiliary pattern 213 is equal to a distance between the first auxiliary pattern 213 and the first gate pattern 212, and the minimum width meeting the requirement and existing between the dummy pattern 24 for filling and the second auxiliary pattern 223 is equal to a distance between the second auxiliary pattern 223 and the second gate pattern 222.

Specifically, the first subpreset width is a minimum width simultaneously meeting etch accuracy requirements of the first auxiliary pattern 213 and the dummy pattern 24, and the second subpreset width is a minimum width simultaneously meeting etch accuracy requirements of the second auxiliary pattern 223 and the dummy pattern. Specific values of the first subpreset width and the second subpreset width may be determined according to the etch accuracy that can be achieved by an etchtool actually used. Ranges of the first subpreset width and the second subpreset width are limited, so as to ensure that the dummy pattern 24 for filling can simultaneously meet etch requirements of the first element region 21 and the second element region 22.

Optionally, after the step of marking at least one of the first element region 21, the second element region 22 and the spacing region 23, the method further includes the following step:

adjusting a position of the first element region 21 and/or the second element region 22 to increase the width D of the spacing region 23 to the preset width.

Specifically, after an unreasonably designed position in the layout is positioned, the width of the spacing region 23 may be adjusted in any one of the following three manners: translating the first element region 21 in a direction along the X-axis and away from the second element region 22; or translating the second element region 22 in a direction along the X-axis and away from the first element region 21; or simultaneously moving the first element region 21 and the second element region 22 in a direction along the X-axis and facing away from each other (as shown in FIG. 2C), so that the spacing region 23 can be filled with at least one dummy pattern 24.

Optionally, the layout method for an integrated circuit further includes the following step:

determining whether the width D of the spacing region 23 is less than the preset width, and if no, filling the spacing region 23 with at least one dummy pattern 24.

Specifically, when it is detected that the width of the spacing region 23 is greater than the preset width, the spacing region 23 is filled with at least one dummy pattern 24. An example in which the spacing region 23 can be filled with two dummy patterns 24 after the width D of the spacing region 23 is increased to the preset width is described in FIG. 2D. A specific number and shape of the dummy pattern 24 for filling, a distance between the dummy pattern 24 for filling and the first element region 21 as well as a distance between the dummy pattern 24 for filling and the second element region 22, and distances between adjacent dummy patterns 24 during filling of a plurality of dummy patterns 24 may be set by those skilled in the art according to an actual requirement, for example, according to a line width of the first gate pattern 212, a line width of the second gate pattern 222, and the like.

Optionally, the step of filling the spacing region 23 with at least one dummy pattern 24 specifically includes:

determining whether a line width W1 of the first gate pattern 212 is equal to a line width W2 of the second gate pattern 222, and if yes, filling the spacing region 23 with the at least one dummy pattern 24, a line width of the dummy pattern 24 being equal to the line width of the first gate pattern 212 or the line width of the second gate pattern 222.

Figure 3A:
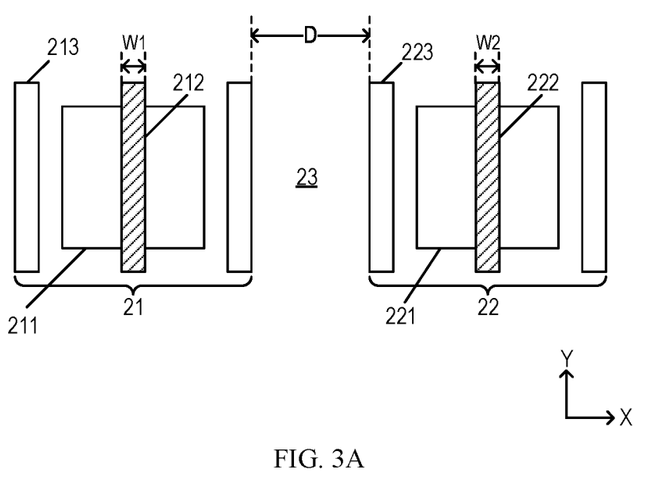
FIG. 3A to FIG. 3J are schematic diagrams of filling of layouts under different scenarios with dummy patterns according to a specific implementation of the present application.
Figure 3B:
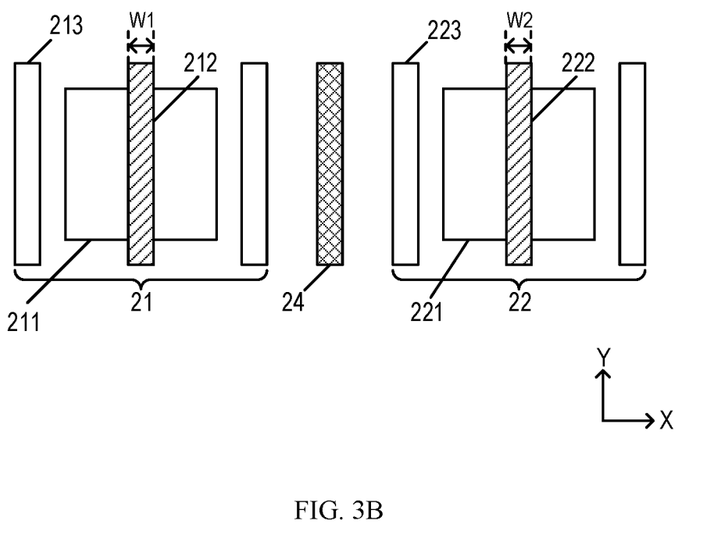

For example, as shown in FIG. 3A, the line width W1 of the first gate pattern 212 and the line width W2 of the second gate pattern 222 are equal (i.e., the first auxiliary pattern 213 and the second auxiliary pattern 223 are in a same shape) and are both less than a preset size. When the width D of the spacing region 23 is greater than or equal to the preset width, the spacing region 23 may be filled with one or more dummy patterns 24. An example of filling of one dummy pattern 24 is described in FIG. 3B. In this case, the shape and size of the dummy pattern 24 for filling are the same as those of the first gate pattern 212 or the second gate pattern 222. A distance between the dummy pattern 24 for filling and the first auxiliary pattern 213 and a distance between the dummy pattern 24 for filling and the second auxiliary pattern 223 are equal. In this specific implementation, the preset size is 10 nm. For example, the line width W1 of the first gate pattern 212 and the line width W2 of the second gate pattern 222 may be 5 nm, 6 nm or 7 nm.

Optionally, the step of filling the spacing region 23 with the at least one dummy pattern 24 specifically includes:

determining whether a line width of the first gate pattern 212 is equal to that of the second gate pattern 222, if no, determining whether the width of the spacing region 23 meets a requirement of simultaneous filling of a first dummy pattern 241 and a second dummy pattern 242, and if yes, simultaneously filling the spacing region 23 with the first dummy pattern 241 and the second dummy pattern 242, the first dummy pattern 241 being a pattern with a line width the same as the first gate pattern 212, and the second dummy pattern 242 being a pattern with a line width the same as the second gate pattern 222.

Whether the width of the spacing region 23 meets a requirement of simultaneous filling of a first dummy pattern 241 and a second dummy pattern 242 specifically includes: a distance between the first dummy pattern 241 filling the spacing region 23 and the first auxiliary pattern 213 being greater than or equal to the first subpreset width, and a distance between the second dummy pattern 242 filling the spacing region 23 and the second auxiliary pattern 223 being greater than or equal to the second subpreset width.

Figure 3C:
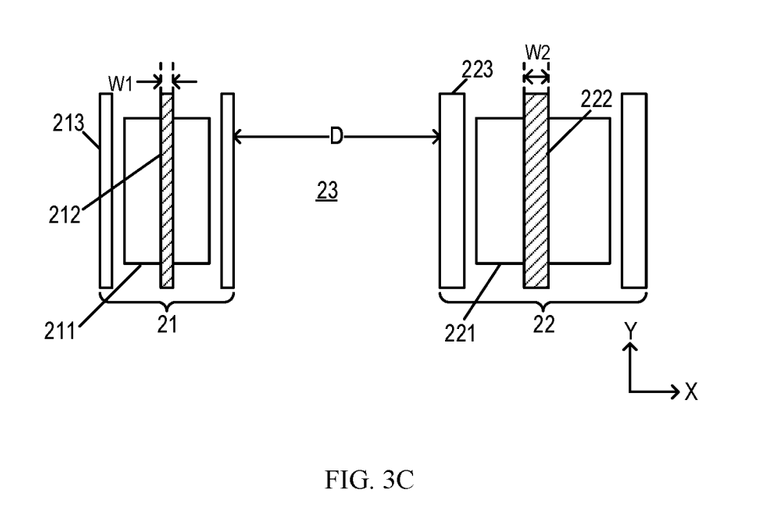
Figure 3D:
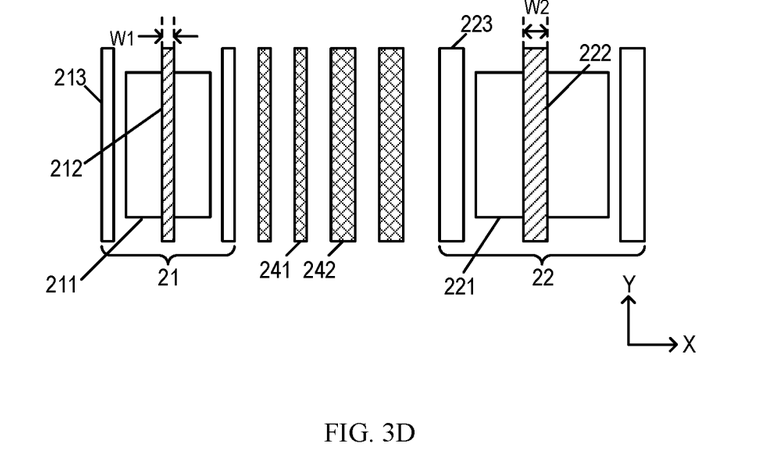

For example, as shown in FIG. 3C, the line width W1 of the first gate pattern 212 and the line width W2 of the second gate pattern 222 are less than the preset size, the line width W1 of the first gate pattern 212 is less than the line width W2 of the second gate pattern 222 (i.e., the line width of the first auxiliary pattern 213 is less than that of the second auxiliary pattern 223), and the width of the spacing region 23 meets the requirement of simultaneous filling of the first dummy pattern 241 and the second dummy pattern 242; then, the spacing region 23 may be simultaneously filled with two first dummy patterns 241 and two second dummy patterns 242, as shown in FIG. 3D. The first dummy pattern 241 is located on one side of the spacing region 23 close to the first auxiliary pattern 213, and a line width of the first dummy pattern 241 is equal to that of the first gate pattern 212; the second dummy pattern 242 is located on one side of the spacing region 23 close to the second auxiliary pattern 223, and a line width of the second dummy pattern 242 is equal to that of the second gate pattern 222. In this specific implementation, the reason why the spacing region 23 is filled with the two first dummy patterns 241 is that at least three patterns in a same shape (the first auxiliary pattern 213 and the first dummy pattern 241) are arranged on one side of the first gate pattern 212 to better improve a diffraction effect of the first gate pattern 212 during photolithography. The reason why the spacing region 23 is filled with the two second dummy patterns 242 is that at least three patterns in a same shape (the second auxiliary pattern 223 and the second dummy pattern 242) are arranged on one side of the second gate pattern 222 to better improve a diffraction effect of the second gate pattern 222 during photolithography.

In order to further improve the etch diffraction effect, a length of the first dummy pattern 241 for filling (a length along the Y-axis direction in FIG. 3C) is equal to a length of the first auxiliary pattern 213 (a length along the Y-axis direction in FIG. 3C); and a length of the second dummy pattern 242 for filling (a length along the Y-axis direction in FIG. 3C) is equal to a length of the second auxiliary pattern 223 (a length along the Y-axis direction in FIG. 3C).

In this specific implementation, optionally, a distance between the first dummy pattern 241 and the second dummy pattern 242 adjacent to each other and filling the spacing region 23 is greater than or equal to a first threshold. A specific value of the first threshold may be set according to process capability and an actual manufacturing condition, such as a photolithography accuracy requirement. In other specific implementations, the method further includes the following step:

determining whether a distance between the first dummy pattern 241 and the second dummy pattern 242 after filling is less than a first threshold, and if yes, enabling the first dummy pattern 241 for filling to be connected to the second dummy pattern 242 for filling.

Optionally, the step of filling the spacing region 23 with at least one dummy pattern 24 specifically includes:

determining whether a line width of the first gate pattern 212 is equal to that of the second gate pattern 222, if no, determining whether the width of the spacing region 23 meets a requirement of simultaneous filling of a first dummy pattern 241 and a second dummy pattern 242, if no, re-determining whether the line width of the first gate pattern 212 is less than that of the second gate pattern 222, if yes, filling the spacing region 23 with only the first dummy pattern 241, and if no, filling the spacing region 23 with only the second dummy pattern 242, the first dummy pattern 241 being a pattern with a line width the same as the first gate pattern 212, and the second dummy pattern 242 being a pattern with a line width the same as the second gate pattern 222.

Optionally, a length of the first dummy pattern 241 is equal to that of the first auxiliary pattern 213, and a length of the second dummy pattern 242 is equal to that of the second auxiliary pattern 223.

Optionally, the layout method for an integrated circuit further includes the following step:

determining whether a distance between the first dummy pattern 241 after filling and the second auxiliary pattern 223 is less than a first threshold, and if yes, enabling the first dummy pattern 241 for filling to be connected to the second auxiliary pattern 223.

Figure 3E:
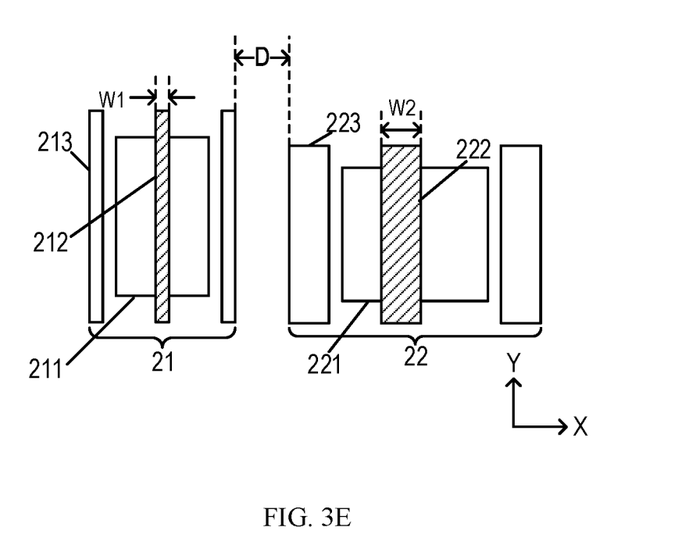
Figure 3F:
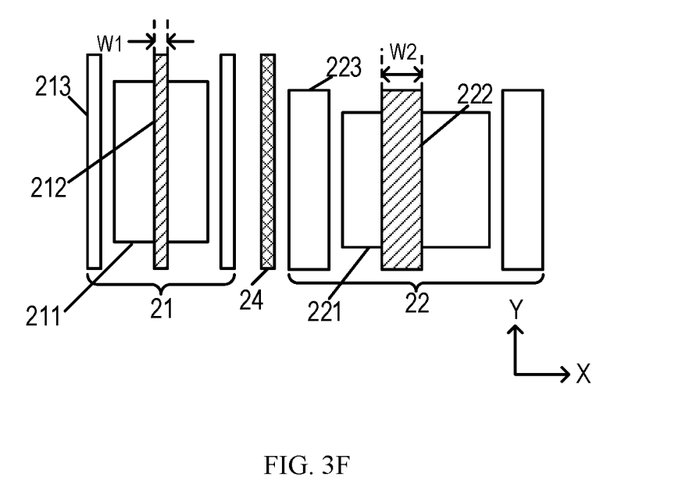

For example, as shown in FIG. 3E, the line width W1 of the first gate pattern 212 is less than the preset size, and the line width W2 of the second gate pattern 222 is greater than the preset size; that is, the line width W1 of the first gate pattern 212 is not equal to the line width W2 of the second gate pattern 222. If the width D of the spacing region 23 is insufficient for the filling of two dummy patterns and the line width W1 of the first gate pattern 212 is less than the line width W2 of the second gate pattern 222, the spacing region may be filled with only one first dummy pattern 241 having a line width the same as the first gate pattern 212 or the first auxiliary pattern 213, as shown in FIG. 3F. This is because the larger the line width, the less affected by the diffraction effect during the photolithography. Due to the smaller line width of the first dummy pattern 241, the photolithography of the second gate pattern 222 is less affected. Conversely, if the line width W1 of the first gate pattern 212 is greater than the line width W2 of the second gate pattern 222, the spacing region 23 may be filled with only the second dummy pattern 242.

A specific value of the first threshold may be set according to process capability and an actual manufacturing condition, such as a photolithography accuracy requirement. When a distance between the first dummy pattern 241 after filling and the second auxiliary pattern 223 is less than the first threshold, the first dummy pattern 241 for filling is enabled to be directly connected to the second auxiliary pattern 223. When the distance between the first dummy pattern 241 after filling and the second auxiliary pattern 223 is greater than the first threshold, the first dummy pattern 241 for filling is enabled to be isolated from the second auxiliary pattern 223.

Optionally, the layout method for an integrated circuit further includes the following step:

determining whether a conductive plug 25 adjacent to the first element region exists on a periphery of the first element region 21, and if yes, filling a space between the first element region 21 and the conductive plug 25 with a plug dummy pattern 244, a line width of the plug dummy pattern 244 being equal to that of the first gate pattern 212.

Figure 3G:
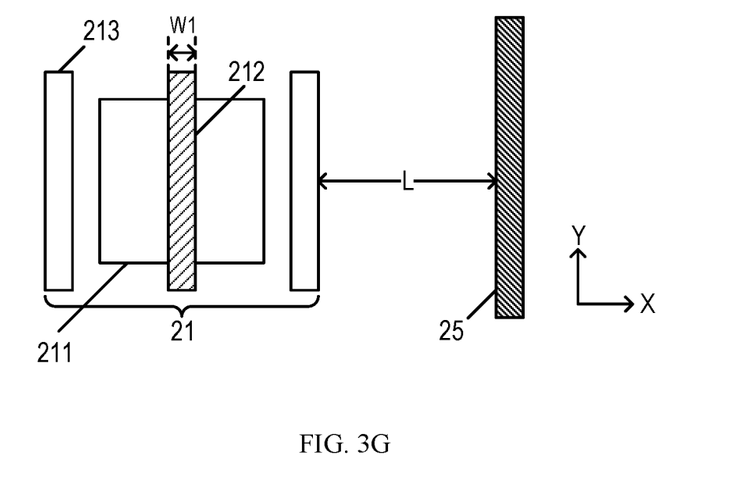
Figure 3H:
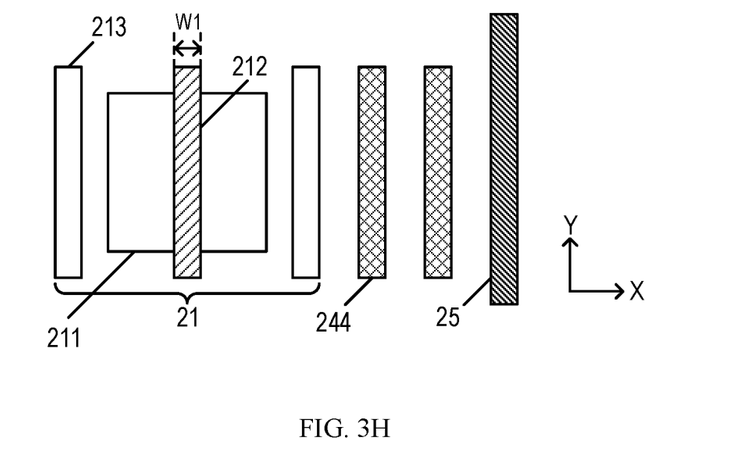

For example, as shown in FIG. 3G, when it is detected that the conductive plug 25 adjacent to the first element region exists on the periphery of the first element region 21, the space between the first element region 21 and the conductive plug 25 may also be filled with at least two plug dummy patterns 244, as shown in FIG. 3H, so that one side of the first gate pattern toward the conductive plug 25 meets the requirement of having at least three patterns in a same shape (including the first auxiliary pattern and the dummy pattern for filling), so as to improve a photolithography effect. The line width of the plug dummy pattern 244 is equal to that of the first gate pattern 212, and the length of the dummy pattern 24 is equal to that of the first auxiliary pattern 213.

Optionally, the layout further includes a conductive plug 25 and a third element region 26 adjacent to the first element region 21; the third element region 26 includes a third active area, a third gate pattern 261 located in the third active area and a third auxiliary pattern 262 located on an outer side of the third active area; and the layout method for an integrated circuit further includes the following step:

determining whether the first element region 21, the third element region 26 and the conductive plug 25 jointly define a blank region 28, and if yes, filling the blank region 28 with a third dummy pattern 243 matching both the first element region 21 and the third element region 26, the blank region 28 being a region provided with no gate pattern.

The blank region 28 in this specific implementation is the region provided with no gate pattern. The third dummy pattern 243 matching both the first element region 21 and the third element region 26 means that a shape of the third dummy pattern 243 matches one or more of extension directions, extension lengths and line widths of elements in the first element region 21 and the third element region 26 and a spacing distance between adjacent elements, so as to improve the photolithography quality of the patterns in the first element region 21 and the third element region 26.

Optionally, the first gate pattern 212 and the third gate pattern 261 extend along a first direction, the first gate pattern 212 and the third gate pattern 261 are spaced along a second direction, the first direction is perpendicular to the second direction, and a length or position of the first gate pattern 212 in the first direction is beyond that of the third gate pattern 261; and the step of filling the blank region 28 with the third dummy pattern 243 matching both the first element region 21 and the third element region 26 specifically includes:

filling the blank region 28 with the third dummy pattern 243 extending along the first direction, a position of the third dummy pattern 243 being aligned with that of the third gate pattern 261 or the third auxiliary pattern 262 in the first direction and aligned with that of the first gate pattern 212 or the first auxiliary pattern 213 in the second direction.

Figure 3I:
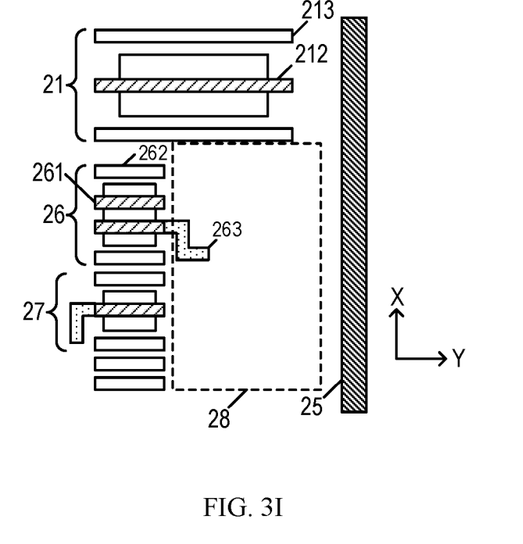

For example, the first direction is a Y-axis direction, and the second direction is an X-axis direction. As shown in FIG. 3I, when it is detected that the first element region 21, the third element region 26 and the conductive plug 25 jointly define one blank region 28, the blank region 28 is filled with a plurality of third dummy patterns 243 extending along the Y-axis direction and arranged along the X-axis direction. A boundary of each of the dummy patterns close to one side of the conductive plug 25 is flush with the first gate pattern 212. In the Y-axis direction, the plurality of third dummy patterns 243 are aligned with a plurality of third gate patterns 261 in the third element region 26 and the third auxiliary pattern 262 located outside the third active area.

Optionally, the blank region 28 is filled with the plurality of third dummy patterns 243; and     in the second direction, a distance between adjacent third dummy patterns 243 is equal to that between the third gate pattern 261 and the third auxiliary pattern 262.

Specifically, in order to further improve a subsequent etcheffect on the first element region 21 and the third element region 26, the blank region 28 may be filled with a plurality of third dummy patterns 243 completely. For example, when the blank region 28 is surrounded by only the third element region 26, the first element region 21 and the conductive plug 25, a number of the third dummy pattern 243 filling the blank region 28 is equal to a sum of numbers of the third gate pattern 261 and the third auxiliary pattern 262 in the third element region 26, and the distance between adjacent third dummy patterns 243 is equal to that between the third gate pattern 261 and the third auxiliary pattern 262.

Optionally, the layout method for an integrated circuit further includes the following step:

determining whether another element pattern exists in the blank region 28, and if yes, controlling a minimum distance between the third dummy pattern 243 and the another element pattern to be greater than or equal to a second threshold.

Figure 3J:
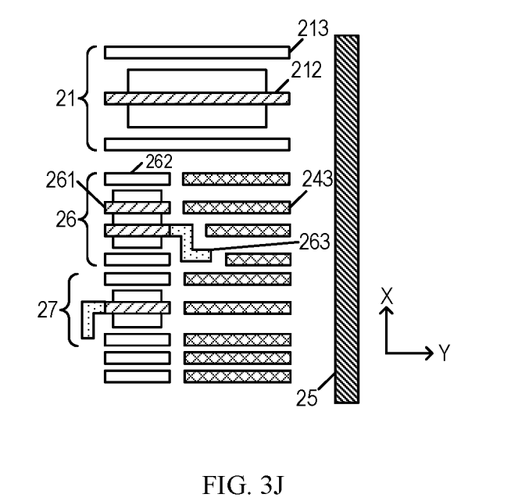

For example, when the third element region 26 includes a metal connection structure 263 and the metal connection structure 263 extends to the blank region 28, the third dummy pattern 243 is set to avoid the metal connection structure 263, as shown in FIG. 3J. When the layout further includes a fourth element region 27 and the first element region 21, the third element region 26, the fourth element region 27 and the conductive plug 25 jointly define a blank region, the third dummy pattern for filling should be further aligned with a fourth gate pattern and a fourth auxiliary pattern in the fourth element region. A specific value of the second threshold may be set according to process capability and an actual manufacturing condition, such as a photolithography accuracy requirement. The first threshold may be equal or not equal to the second threshold, which may be set by those skilled in the art according to an actual manufacturing requirement.

An example in which a width value of the spacing region is increased to the preset width when the width of the spacing region is less than the preset width is described in this specific implementation. In other specific implementations, after the step of marking at least one of the first element region 21, the second element region 22 and the spacing region 23, the method further includes the following step:

determining whether the width of the spacing region 23 is less than the first subpreset width, and if no, filling the spacing region 23 with the first dummy pattern 241, a line width of the first dummy pattern 241 being equal to that of the first gate pattern 212.

In other specific implementations, after at least one of the first element region 21, the second element region 22 and the spacing region 23 is marked and the width of the spacing region is determined to be greater than the first subpreset width, the method further includes the following step:

determining whether a distance between the first dummy pattern 241 filling the spacing region 23 and the second auxiliary pattern 213 is less than a first threshold, and if yes, enabling the first dummy pattern 241 for filling to be connected to the second auxiliary pattern 223.

Specifically, in other specific implementations, after the width of the spacing region 23 is determined to be less than the preset width, the method may further include the following step: determining whether the width of the spacing region 23 is less than the first subpreset width, and if no, filling the spacing region 23 with the first dummy pattern 241, the first dummy pattern 241 being a pattern with a line width the same as that of the first gate pattern 212. Alternatively, after the width of the spacing region 23 is determined to be less than the preset width, the method may further include the following step: determining whether the width of the spacing region 23 is less than the second subpreset width, and if no, filling the spacing region 23 with the second dummy pattern 242, the second dummy pattern 242 being a pattern with a line width the same as that of the second gate pattern 222. That is, a corresponding determination manner can be selected according to relative sizes of the first subpreset width and the second subpreset width.

For example, after the width of the spacing region 23 is determined to be less than the preset width and greater than the first subpreset width, it is determined whether a distance between the first dummy pattern 241 filling the spacing region 23 and the second auxiliary pattern 213 is less than the first threshold, and if yes, the first dummy pattern 241 for filling is enabled to be connected to the second auxiliary pattern 223.

Figure 4:
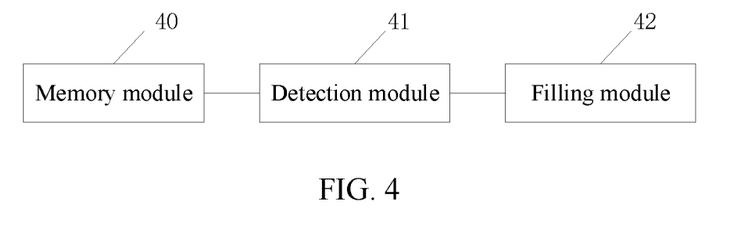
FIG. 4 is a structural block diagram of a layout apparatus for an integrated circuit according to a specific implementation of the present application.

In addition, this specific implementation further provides a layout apparatus for an integrated circuit. FIG. 4 is a structural block diagram of a layout apparatus for an integrated circuit according to a specific implementation of the present application. The layout apparatus for an integrated circuit according to this specific implementation may lay out a layout by using the layout method for an integrated circuit shown in FIG. 1, FIG. 2A to FIG. 2D and FIG. 3A to FIG. 3J. As shown in FIG. 1, FIG. 2A to FIG. 2D, FIG. 3A to FIG. 3J and FIG. 4, the layout apparatus for an integrated circuit according to the specific implementation includes:

- a memory module 40 configured to store a layout, the layout including a first element region 21 and a second element region 22, a spacing region 23 being provided between the first element region 21 and the second element region 22, wherein the memory module 40 may include any combination of different types of non-volatile memory apparatuses and/or volatile memory apparatuses, and the volatile memory apparatus (such as a memory apparatus) may be (but not limited to) a random access memory (RAM), such as a dynamic random access memory (DRAM) or a synchronous dynamic random access memory (SDRAM); and
- a detection module 41 connected to the memory module 40 and configured to detect whether a width of the spacing region 23 is less than a preset width, and if yes, mark at least one of the first element region 21, the second element region 22 and the spacing region 23, the preset width being a minimum width meeting a requirement, wherein the requirement is to fill the spacing region 23 with at least one dummy pattern 24. The detection module 41 may be a microcontroller, a dedicated logic circuit system (for example, a field-programmable gate array (FPGA), a dedicated integrated circuit (ASIC), or the like), or other suitable processors. When the detection module 41 is a microcontroller, data in the memory module 40 may be read, it is detected whether a width of the spacing region 23 is less than a preset width, and if yes, at least one of the first element region 21, the second element region 22 and the spacing region 23 is marked.

Optionally, the first element region 21 includes a first active area 211, a first gate pattern 212 located in the first active area 211 and a first auxiliary pattern 213 located on one side of the first element region 211 toward the second element region 22, and the second element region 22 includes a second active area 221, a second gate pattern 222 located in the second active area 221 and a second auxiliary pattern 223 located on one side of the second active area 221 toward the first element region 21; and the detection module 41 is configured to measure a distance between the first auxiliary pattern 213 and the second auxiliary pattern 223; or the detection module 41 is configured to measure a distance between the first active area 211 and the second active area 221, and calculate a distance between the first auxiliary pattern 213 and the second auxiliary pattern 223.

Optionally, the layout apparatus for an integrated circuit further includes:

a filling module 42 connected to the detection module 41 and configured to fill the spacing region 23 with at least one dummy pattern 24 when the detection module 41 detects that the width of the spacing region 23 is greater than the preset width. The filling module 42 may be implemented in at least one hardware form of Digital Signal Processing (DSP), a Field-Programmable Gate Array (FPGA) and a Programmable Logic Array (PLA). When the filling module 42 is implemented in the form of the field-programmable gate array, the field-programmable gate array may be arranged as a graphics processing unit (GPU) configured to execute a special-purpose instruction, such as a graph fill instruction. When the detection module 41 detects that the width of the spacing region 23 is greater than the preset width, the graphics processing unit (GPU) instructs the filling module 42 to fill the spacing region 23 with the at least one dummy pattern 24.

Optionally, the filling module 42 is further configured to determine whether a line width W1 of the first gate pattern 212 is equal to a line width W2 of the second gate pattern 222, and if yes, fill the spacing region 23 with the at least one dummy pattern 24, a line width of the dummy pattern 24 being equal to the line width of the first gate pattern 212 or the line width of the second gate pattern 222.

Optionally, the filling module 42 is further configured to determine whether a line width of the first gate pattern 212 is equal to that of the second gate pattern 222, if no, determine whether the width of the spacing region 23 meets a requirement of simultaneous filling of a first dummy pattern 241 and a second dummy pattern 242, and if yes, simultaneously fill the spacing region 23 with the first dummy pattern 241 and the second dummy pattern 242, the first dummy pattern 241 being a pattern with a line width the same as the first gate pattern 212, and the second dummy pattern 242 being a pattern with a line width the same as the second gate pattern 222.

Optionally, the filling module 42 is further configured to determine whether a line width of the first gate pattern 212 is equal to that of the second gate pattern 222, if no, determine whether the width of the spacing region 23 meets a requirement of simultaneous filling of a first dummy pattern 241 and a second dummy pattern 242, if no, re-determine whether the line width of the first gate pattern 212 is less than that of the second gate pattern 222, if yes, fill the spacing region 23 with only the first dummy pattern 241, and if no, fill the spacing region 23 with only the second dummy pattern 242, the first dummy pattern 241 being a pattern with a line width the same as the first gate pattern 212, and the second dummy pattern 242 being a pattern with a line width the same as the second gate pattern 222.

Optionally, the filling module 42 is further configured to determine whether a conductive plug 25 adjacent to the first element region exists on a periphery of the first element region 21, and if yes, fill a space between the first element region 21 and the conductive plug 25 with a plug dummy pattern 244, a line width of the plug dummy pattern 244 being equal to that of the first gate pattern 212.

Optionally, the layout further includes a conductive plug 25 and a third element region 26 adjacent to the first element region 21; the third element region includes a third active area, a third gate pattern 261 located in the third active area and a third auxiliary pattern 262 located on an outer side of the third active area; and the filling module 42 is further configured to determine whether the first element region 21, the third element region 26 and the conductive plug 25 jointly define a blank region 28, and if yes, fill the blank region 28 with the third dummy pattern 243 matching both the first element region 21 and the third element region 26, the blank region 28 being a region provided with no gate pattern.

Optionally, the detection module 41 is further configured to, after at least one of the first element region 21, the second element region 22 and the spacing region 23 is marked, adjust positions of the first element region 21 and/or the second element region 22 to increase the width of the spacing region 23 to the preset width.

Through the layout method and the layout apparatus for an integrated circuit according to the specific implementations, a width of a spacing region between two adjacent element regions in a layout is automatically detected, and an element region and/or a spacing region not meeting a filling requirement of a dummy pattern are/is marked, so as to quickly and accurately position a poorly-placed element region in the layout, so that the layout can be adjusted in time, which saves human resources, improves the layout efficiency and layout precision of the integrated circuit, and lays a foundation for improving photolithography quality, shortening a development cycle of the integrated circuit, improving a yield of semiconductor products and the like.

In the above descriptions, technical details of patterning and etching of the layers are not described. However, it is to be understood by those skilled in the art that various measures in the prior art may be utilized to form the layers and regions in desired shapes. Further, to form a same structure, those skilled in the art can design methods not entirely the same as those described above. Although the embodiments are described separately above, it does not mean that the beneficial features in these embodiments cannot be used in combination.

It should be understood that the above specific implementations of the present application are intended only to illustrate or explain the principles of the present application, and are not intended to limit the present application. Therefore, any modifications, equivalent replacements, improvements and the like made without departing from the spirit and the scope of the present application are intended to be included within the protection scope of the present application. Furthermore, the appended claims of the present application are intended to cover all changes and modified examples that fall within the scope and bounds or equivalents of such scope and bounds of the appended claims.

What is claimed is:

1. A layout method for an integrated circuit, comprising the following steps:
providing a layout, the layout comprising a first element region and a second element region, a spacing region being provided between the first element region and the second element region; and
detecting whether a width of the spacing region is less than a preset width, and if yes, marking at least one of the first element region, the second element region and the spacing region, the preset width being a minimum width meeting a requirement, wherein the requirement is to fill the spacing region with at least one dummy pattern;
wherein
the first element region comprises a first active area, a first gate pattern located in the first active area and a first auxiliary pattern located on one side of the first element region toward the second element region, and the second element region comprises a second active area, a second gate pattern located in the second active area and a second auxiliary pattern located on one side of the second element region toward the first element region; and the step of detecting whether a width of the spacing region is less than a preset width specifically comprises:
measuring a distance between the first auxiliary pattern and the second auxiliary pattern; or
measuring a distance between the first active area and the second active area, and calculating a distance between the first auxiliary pattern and the second auxiliary pattern;
wherein
the preset width comprises a first subpreset width and a second subpreset width;
the first subpreset width is a minimum width meeting the requirement and existing between the dummy pattern for filling and the first auxiliary pattern, and the second subpreset width is a minimum width meeting the requirement and existing between the dummy pattern for filling and the second auxiliary pattern; and
the minimum width meeting the requirement and existing between the dummy pattern for filling and the first auxiliary pattern is equal to a distance between the first auxiliary pattern and the first gate pattern, and the minimum width meeting the requirement and existing between the dummy pattern for filling and the second auxiliary pattern is equal to a distance between the second auxiliary pattern and the second gate pattern.

2. The layout method for an integrated circuit according to claim 1, further comprising the following step:
determining whether the width of the spacing region is less than the preset width, and if no, filling the spacing region with at least one dummy pattern.

3. The layout method for an integrated circuit according to claim 2, wherein
the step of filling the spacing region with at least one dummy pattern specifically comprises:
determining whether a line width of the first gate pattern is equal to that of the second gate pattern, and if yes, filling the spacing region with the at least one dummy pattern, a line width of the dummy pattern being equal to that of the first gate pattern or the second gate pattern.

4. The layout method for an integrated circuit according to claim 2, wherein
the step of filling the spacing region with at least one dummy pattern specifically comprises:
determining whether a line width of the first gate pattern is equal to that of the second gate pattern, if no, determining whether the width of the spacing region meets a requirement of simultaneous filling of a first dummy pattern and a second dummy pattern, and if yes, simultaneously filling the spacing region with the first dummy pattern and the second dummy pattern, the first dummy pattern being a pattern with a line width the same as the first gate pattern, and the second dummy pattern being a pattern with a line width the same as the second gate pattern.

5. The layout method for an integrated circuit according to claim 4, wherein
a length of the first dummy pattern is equal to that of the first gate pattern or the first auxiliary pattern, and a length of the second dummy pattern is equal to that of the second gate pattern or the second auxiliary pattern.

6. The layout method for an integrated circuit according to claim 4, further comprising the following step:

determining whether a distance between the first dummy pattern and the second dummy pattern after filling is less than a first threshold, and if yes, enabling the first dummy pattern for filling to be connected to the second dummy pattern for filling.

7. The layout method for an integrated circuit according to claim 2, wherein the step of filling the spacing region with at least one dummy pattern specifically comprises:

determining whether a line width of the first gate pattern is equal to that of the second gate pattern, if no, determining whether the width of the spacing region meets a requirement of simultaneous filling of a first dummy pattern and a second dummy pattern, if no, re-determining whether the line width of the first gate pattern is less than that of the second gate pattern, if yes, filling the spacing region with only the first dummy pattern, and if no, filling the spacing region with only the second dummy pattern, the first dummy pattern being a pattern with a line width the same as the first gate pattern, and the second dummy pattern being a pattern with a line width the same as the second gate pattern.

8. The layout method for an integrated circuit according to claim 1, further comprising the following step:

determining whether a conductive plug adjacent to the first element region exists on a periphery of the first element region, and if yes, filling a space between the first element region and the conductive plug with a plug dummy pattern, a line width of the plug dummy pattern being equal to that of the first gate pattern.

9. The layout method for an integrated circuit according to claim 1, wherein the layout further comprises a conductive plug and a third element region adjacent to the first element region; the third element region comprises a third active area, a third gate pattern located in the third active area and a third auxiliary pattern located on an outer side of the third active area; and the layout method for an integrated circuit further comprises the following step:

determining whether the first element region, the third element region and the conductive plug jointly define a blank region, and if yes, filling the blank region with a third dummy pattern matching both the first element region and the third element region, the blank region being a region provided with no gate pattern.

10. The layout method for an integrated circuit according to claim 9, wherein the first gate pattern and the third gate pattern extend along a first direction, the first gate pattern and the third gate pattern are spaced along a second direction, the first direction is perpendicular to the second direction, and a length or position of the first gate pattern in the first direction is beyond that of the third gate pattern; and the step of filling the blank region with the third dummy pattern matching both the first element region and the third element region specifically comprises:

filling the blank region with the third dummy pattern extending along the first direction, a position of the third dummy pattern being aligned with that of the third gate pattern or the third auxiliary pattern in the first direction and aligned with that of the first gate pattern or the first auxiliary pattern in the second direction.

11. The layout method for an integrated circuit according to claim 10, wherein the blank region is filled with a plurality of third dummy patterns; and in the second direction, a distance between adjacent third dummy patterns is equal to that between the third gate pattern and the third auxiliary pattern.

12. The layout method for an integrated circuit according to claim 10, further comprising the following step:

determining whether another element pattern exists in the blank region, and if yes, controlling a minimum distance between the third dummy pattern and the another element pattern is greater than or equal to a second threshold.

13. The layout method for an integrated circuit according to claim 1, after the step of marking at least one of the first element region, the second element region and the spacing region, further comprising the following step:

adjusting a position of the first element region and/or the second element region to increase the width of the spacing region to the preset width.

14. The layout method for an integrated circuit according to claim 1, after the step of marking at least one of the first element region, the second element region and the spacing region, further comprising the following step:

determining whether the width of the spacing region is less than the first subpreset width, and if no, filling the spacing region with the dummy pattern, a line width of the dummy pattern being equal to that of the first gate pattern.

15. The layout method for an integrated circuit according to claim 14, after the width of the spacing region is determined to be greater than the first subpreset width, further comprising the following step:

determining whether a distance between the dummy pattern filling the spacing region and the second auxiliary pattern is less than a first threshold, and if yes, enabling the dummy pattern for filling to be connected to the second auxiliary pattern.

* * * * *